United States Patent
Aumann et al.

(10) Patent No.: US 12,208,751 B2
(45) Date of Patent: Jan. 28, 2025

(54) METHOD FOR PRODUCING A TRIM PART, AND A TRIM PART

(71) Applicant: Bayerische Motoren Werke Aktiengesellschaft, Munich (DE)

(72) Inventors: Thomas Aumann, Buch am Erlbach (DE); Florian Dechant, Adlkofen (DE); Johann Gasslhuber, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 330 days.

(21) Appl. No.: 17/739,459

(22) Filed: May 9, 2022

(65) Prior Publication Data
US 2022/0355746 A1    Nov. 10, 2022

(30) Foreign Application Priority Data

May 10, 2021  (DE) .................... 10 2021 112 114.0
Jul. 20, 2021  (DE) .................... 10 2021 118 778.8

(51) Int. Cl.
*B60R 13/02*    (2006.01)
*A44B 18/00*    (2006.01)

(52) U.S. Cl.
CPC ...... *B60R 13/0256* (2013.01); *A44B 18/0034* (2013.01)

(58) Field of Classification Search
CPC . B60R 13/0256; B60R 13/02; B60R 13/0212; B60R 13/0243; B60R 13/0262; A44B 18/0034; A44B 18/0023
See application file for complete search history.

(56) References Cited

U.S. PATENT DOCUMENTS

| | | | | |
|---|---|---|---|---|
| 3,577,607 A | * | 5/1971 | Ikoma ................ | A44B 18/0023 24/445 |
| 3,849,840 A | * | 11/1974 | Yamada ............. | A44B 18/0023 156/332 |
| 4,290,174 A | * | 9/1981 | Kalleberg .......... | A44B 18/0019 24/444 |
| 4,670,960 A | * | 6/1987 | Provost ................ | B26D 3/10 29/415 |
| 6,397,638 B1 | | 6/2002 | Roell | |
| 6,687,692 B1 | * | 2/2004 | Balaban ................ | G06F 16/972 |

(Continued)

FOREIGN PATENT DOCUMENTS

| | | | |
|---|---|---|---|
| BE | 1019121 A3 | * | 3/2012 |
| CN | 110629386 A | * | 12/2019 |

(Continued)

OTHER PUBLICATIONS

English translation of BE 1019121 A3 (Year: 2012).*

(Continued)

*Primary Examiner* — Lori Lyjak
(74) *Attorney, Agent, or Firm* — Crowell & Moring LLP

(57) ABSTRACT

A method for producing a trim part includes generating a surface covering, wherein the surface covering is generated by a knitting method and fastening elements are disposed on the surface covering. The carrier part is covered with the generated surface covering. Fixing elements are disposed on the carrier part. The fastening elements of the surface covering are connected in a form-fitting manner to the fixing elements of the carrier part.

10 Claims, 2 Drawing Sheets

(56) References Cited

U.S. PATENT DOCUMENTS

| | | | | |
|---|---|---|---|---|
| 2004/0099020 A1* | 5/2004 | Sasser | A44B 18/0092 | 66/203 |
| 2004/0166282 A1* | 8/2004 | Kingsford | A44B 18/0092 | 428/95 |
| 2006/0149210 A1* | 7/2006 | Sawyer | A44B 18/0034 | 604/391 |
| 2015/0250271 A1* | 9/2015 | Ogilvie | A44B 18/00 | 24/444 |
| 2016/0075081 A1* | 3/2016 | Kielinen | B60R 13/0256 | 156/245 |
| 2017/0181505 A1* | 6/2017 | Burke | A44B 18/0038 | |
| 2019/0203392 A1* | 7/2019 | Alexander | A44B 18/0034 | |

FOREIGN PATENT DOCUMENTS

| | | | | |
|---|---|---|---|---|
| CN | 110693140 A | * | 1/2020 | |
| DE | 198 47 331 A1 | | 4/2000 | |
| DE | 199 02 205 A1 | | 8/2000 | |
| DE | 10 2018 212 746 A1 | | 2/2020 | |
| DE | 102018212741 A1 | * | 2/2020 | |
| FR | 2786372 A1 | * | 6/2000 | ......... A44B 18/0003 |
| JP | 07289312 A | * | 11/1995 | ......... A44B 18/0023 |
| JP | 2001149118 A | * | 6/2001 | |
| JP | 2010253183 A | * | 11/2010 | ......... A44B 18/0023 |
| WO | WO-9726133 A1 | * | 7/1997 | ......... A44B 18/0023 |

OTHER PUBLICATIONS

English translation of CN 110629386 A (Year: 2019).*
English translation of DE 102018212741 A1 (Year: 2020).*
German -language Search Report issued in German Application No. 10 2021 118 778.8 dated Mar. 25, 2022 with partial English translation (12 pages).

* cited by examiner

METHOD FOR PRODUCING A TRIM PART, AND A TRIM PART

CROSS REFERENCE TO RELATED APPLICATIONS

This application claims priority under 35 U.S.C. § 119 from German Patent Application No. DE 10 2021 112 114.0, filed May 10, 2021, and DE 10 2021 118 778.8, filed Jul. 20, 2021, the entire disclosures of which are herein expressly incorporated by reference.

BACKGROUND AND SUMMARY

The present invention relates to a method for producing a trim part and to a trim part.

In the construction of automobiles nowadays, surfaces in the vehicle interior, or in the passenger cabin of motor vehicles, respectively, are provided with decors in order to generate an appealing visual impression for vehicle occupants. There are a multiplicity of surface variants (leather, artificial leather, films, textiles) for the interior equipment components or trim parts, respectively, the surface variants being applied to a carrier by way of various laminating methods. A warp-knitted and/or weft-knitted spacer fabric, a foam backing or a non-woven material is currently used as a tactile layer for laminated interior equipment components, for example. It has become customary here for decors, for example in the form of films with the visual impact of wood or carbon, to be adhesively bonded to a plastics material carrier. It is moreover also known for skins of leather or artificial leather to be mounted on carrier structures with the aid of laminating methods, for example press-laminating methods or similar laminating methods, without a fixed upper tool, for example, so as to generate a visual impact of leather. In this laminating procedure the films or the skins are connected to the underlying carrier structure in a materially integral manner with the aid of an adhesive. The heat for activating the adhesive is introduced through the skin into the adhesive joint by a warm press die of the press-laminating tool by way of contact heat or by means of IR radiation. As a result, the adhesive is activated during the laminating method and connects the film or the skin, respectively, to the carrier structure.

However, by virtue of the materials used and by virtue of the production methods used, many of these surfaces are restricted in terms of the application potential of the trim parts in the vehicle interior.

Proceeding from this prior art, the present invention is based on the object of providing a trim part as well as a production method for a trim part, the trim part being able to be used in many different specific applications.

This object is achieved by a method and by a trim part in accordance with the independent claims. Further embodiments are set forth in the dependent patent claims relating thereto.

In order for this object to be achieved, the invention proposes a method for producing a trim part, comprising the steps:
 generating a surface covering, wherein the surface covering is produced by a knitting method, in particular a two-dimensional or three-dimensional knitting method, and wherein fastening elements are disposed on the surface covering; and
 covering a carrier part with the generated surface covering, wherein fixing elements are disposed on the carrier part.

The fastening elements of the surface covering are connected in a form-fitting manner to the fixing elements of the carrier part when the carrier part is being covered with the surface covering.

The fastening elements here can be disposed only in a peripheral region of a surface of the surface covering that faces the carrier part, wherein the peripheral region extends along the circumference of the surface covering.

Alternatively or additionally, the fastening elements can be disposed on a surface of the surface covering that faces the carrier part, wherein the fastening elements are distributed across the entire surface.

Fastening elements which by knitting are attached in an encircling manner as well as to the face can thus be achieved by way of the knitting process. Using these fastening elements, the covering can be upholstered, tensioned and fixed on the carrier part without any adhesive. As a result, the adhesive process is dispensed with, and the possibilities of replacing and recycling the dashboard are enabled.

According to a first embodiment, the fastening elements can be knitted when generating the surface covering. According to this embodiment, the fastening elements are configured so as to be integral to the surface covering or so as to be in one piece with the latter. In other words: the fastening elements are likewise knitted when knitting the surface covering. This can take place in that, for example, the fastening elements are configured as slings during knitting.

According to a second embodiment of the method, pre-existing fastening elements are incorporated in the knitting of the surface covering when generating the surface covering. Fastening elements of this type can be configured as slings, for example. Alternatively or else additionally, additional parts such as rings or eyelets can be used as sling-type fastening elements which are incorporated in the knitwear when generating the knitted surface covering. Alternatively or additionally, other fastening elements, in particular in the form of cotter pins, hooks, clips, disks, etc., can also be used as fastening elements.

According to a third embodiment, pre-existing fastening elements can be stitched to the surface covering after the surface covering has been generated.

In a further aspect, the invention relates to a trim part having a knitted surface covering and a carrier part, wherein fastening elements are disposed on the surface covering, fixing elements are disposed on the carrier part, and the fastening elements of the surface covering are connected in a form-fitting manner to the fixing elements of the carrier part.

According to a first embodiment of the trim part, the fastening elements can be knitted so as to be integral to the surface covering.

Furthermore, the fastening elements can be disposed on a surface of the surface covering that faces the carrier element, and the fixing elements can be disposed on a surface of the carrier element that faces the surface covering.

The advantages of the invention are to be mentioned hereunder. As a result of the form-fitting connection between the surface covering and the carrier part the surface material can be removed from the carrier part in an un-destructive manner. Consequently, the entire trim part, or the dashboard, respectively, does not have to be replaced in order for the surface or the surface covering to be replaced. Replacement of the surface covering during use can be necessary in the event of damage or contamination of the surface covering. Faulty positioning can also arise during assembling so that it becomes necessary for the surface covering to be removed and repositioned. The surface material can be particularly easily removed from the carrier by releasing the form-fitting connection not least when disposing of trim parts such as, for example, the dashboard of a vehicle, this leading to corresponding degrees of freedom and simplifications in terms of recycling. Because the surface covering has been produced from only one type of material, for example from polyester fibers, the surface covering can be recycled again without cross-contamination.

In order for the surface covering to be generated, a knitted semi-finished product is first established on a flat-bed knitting machine. The knitted semi-finished product thereafter is washed and subsequently thermoset. The knitted semi-finished product is set on both sides during thermosetting. The knitted semi-finished product is set to the nominal geometry during thermosetting and finished. Setting does not mean preliminary setting/preliminary positioning but thermosetting. During thermosetting, the knitted semi-finished product shrinks to the desired nominal dimension as a result of the energy introduced. Additives applied and mixed in are cured and impart the knitted semi-finished product the desired final properties.

The trim part is preferably an interior component for the vehicle interior of a vehicle such as, for example, dashboards, door trims, armrests, center consoles, lockable storage compartments such as glove boxes, etc. Glove boxes can be trimmed on the outside or the inside.

However, the trim part can also be used for other modes of transport such as aircraft, ships, trains, etc. Use of the trim part in items of furniture or interior furnishings is also contemplated.

The use of knitted textiles, for example as knitted semi-finished product, in trim parts for motor vehicles opens up a multiplicity of new possibilities in terms of the production process of the trim parts as well as in terms of the function of these components.

Furthermore, after washing the knitted semi-finished product, the knitted semi-finished product can be dried.

After washing the knitted semi-finished product, a coating/waterproofing or a finishing agent can optionally be applied to the knitted semi-finished product. In the finishing line here an acrylate can be sprayed on after washing and prior to drying, this leading to the solidification of the yarn, or the filaments in the yarn, respectively, as a result of which the knitted semi-finished product becomes more resilient. Additionally or alternatively, functional characteristics such as, for example, water-repellent or dirt-repellent finishes (for example fluorocarbon agents), which are sprayed on prior to the drying process or are applied to the yarn in an immersion bath, can also be applied to the yarns. The self-cleaning characteristics of the knitted semi-finished product can be improved as a result. Furthermore, coatings having fluorescent characteristics can be applied. Further functional characteristics can likewise also be represented.

In a further step, the thermoset knitted semi-finished product is cut to size prior to laminating the carrier part. The external shape of the knitted semi-finished product can thus be pre-tailored and thus adapted to the shape of the carrier part. The tailoring of the blank is preferably performed by means of a laser.

In a first embodiment of the method, the knitted semi-finished product is configured as a two-dimensional broadcloth.

In a second embodiment of the method, a three-dimensional part can be formed as the knitted semi-finished product. When producing 3D knitted fabrics, the covering can be knitted so as to be comparatively accurate in terms of the edges or the blank, respectively. Subsequent cutting from the broadcloth is no longer required. Offcut of material which has to be disposed of as waste, such as when cutting the blanks from the broadcloth, is dispensed with. Production which ranges from waste-minimal to waste-free is created. Furthermore, geometric contours can be conjointly knitted when 3D knitting. A covering which follows the shape and matches the carrier part without stretching or with little stretching can thus be generated. In the case of 2D-knitted blanks, the three-dimensional variation has to be generated by stretching and compressing the blank. 3D knitting furthermore offers far more design possibilities in terms of potential changes in yarns, changes in knitting patterns, and surface design possibilities, etc.

In both methods mentioned, the knitted semi-finished product can be generated on a flat-bed knitting machine having two or more needle beds, wherein at least one thread is used for each needle bed. This offers the advantage that multi-colored knitted semi-finished products can be made by using a plurality of threads. Bottom threads which in a normal, or non-tensioned, respectively, state of the knitted semi-finished product are not visible to an observer can here be made visible by stretching the textile such that the coloration of the bottom threads becomes visible. As a result, geometric variations in the shape of the trim part such as arise, for example, in moldings, edges or in the case of integrated functions such as switches, buttons, air vents, etc., can be reinforced in terms of the visual impression thereof.

In both embodiments of the method the knitted semi-finished product can be configured in multiple tiers. A two-tier knitting method can be established as a result. This offers the advantage of differentiating the textile characteristics of the surface covering, for example of a front side and a rear side of the surface covering. Alternatively, the knitting pattern of the knitted fabric can be varied such that the color of the bottom threads is only visible when looking normally, thus perpendicularly, onto the textile while only the color of the upper side is visible in the case of an oblique viewing direction.

The knitted semi-finished product can furthermore have a first tier that forms the visible side of the surface covering, and a second tier that lies opposite the visible side, wherein the first tier is configured with wider loops and the second tier is configured with tighter loops. The configuration of the second tier with tighter loops offers the advantage that a rear side of the surface covering is more densely knitted and thus has sufficient tightness in relation to the adhesive by way of which the surface covering is adhesively bonded to the underlying carrier part. The embodiment of the second tier with tighter loops furthermore offers the advantage that the surface covering is non-transparent in terms of the underlying carrier part. The color of the carrier part can thus not shine through the surface covering, which could be considered irritating by a vehicle occupant. In other words, the first tier configures a front side and the second tier configures a rear side of the surface covering.

By using a first yarn for the first tier of the knitted semi-finished product and a second yarn for the second tier of the knitted semi-finished product, a knitted semi-finished product having different characteristics in terms of the front side and the rear side thereof can furthermore be generated. It is particularly advantageous for the front side to be knitted in a variable manner using a high loop with open pores because the softness of the surface covering and thus of the trim part which is required in order to achieve sufficient protection of occupants, for example in the case of a head impact in the event of a crash, is achieved as a result. This knitted first tier with wide loops, which ensures the resilience of the trim part, can be used as a replacement of or as an addition to tactile layers. Such tactile layers, for example as warp-knitted/weft-knitted spacer fabrics or as foam material, can be disposed between the surface covering and the underlying carrier part.

Of course, there is also the possibility of laminating a soft layer (non-woven material, warp-knitted/weft-knitted spacer fabric, foam tier, etc.) that improves the tactile characteristics on the rear side of the knitted fabric as is usually known in the case of leather, artificial leather or foam films. This also results in the possibility of embodying the cover layer with fine loops (freedom of design).

The front side, that is to say the first tier of the surface covering, can furthermore have portions which differ from one another as a result of different knitting patterns of the yarn and/or as a result of the use of different yarns. Surface regions which differ in terms of the mechanical characteristics thereof can thus be generated on the trim part. Trim parts which in the transition region to the door mirror, to the armrests, to the dashboard support, have correspondingly adapted characteristics can thus be generated. The variability in terms of making the covering is increased as a result of the possibility of a consciously positioned change of the knitting pattern in the surface covering. As a result, smooth regions which are more resistant to abrasion can be implemented in the armrest region, for example.

The knitted semi-finished product is preferably designed so as to be permeable to air and radiation.

In a further aspect, the invention relates to a trim part for a vehicle, having a surface covering which comprises a knitted semi-finished product, and a carrier part, wherein the surface covering is laminated onto the carrier part.

Furthermore, a coating can be applied to the knitted semi-finished product of the surface covering.

In a first alternative, the knitted semi-finished product can be configured as a two-dimensional broadcloth. In a second alternative, the knitted semi-finished product can be configured as a three-dimensional covering.

The surface covering can furthermore be configured as a knitted semi-finished product configured with multiple tiers, or comprise a knitted semi-finished product configured with multiple tiers, respectively.

The knitted semi-finished product can have a first tier that forms the visible side of the surface covering, and a second tier that lies opposite the visible side, wherein the first tier is configured with wider loops and the second tier is configured with tighter loops. Alternatively thereto, the first tier can be configured with tighter loops than the second tier.

The first tier in at least one region can be configured with a first type of knitting pattern or a first yarn, and in at least one second region configured with a second type of knitting pattern or a second knitting pattern yarn.

The invention offers the advantage that the representation of lines, symbols, patterns, contours is able to be implemented by way of multi-colored knitted fabrics. The abrasion resistance of the trim part can be implemented by stress-optimized materials or yarn characteristics, respectively, and/or by stress-optimized yarn-connecting methods. Acrylate or fusible yarns, for example, are particularly suitable as stress-optimizing yarn solidification materials. In order to enhance the sustainability of the trim part, recycled polyester yarns which are harvested from recycled polyethylene bottles, for example, can be used in particular. The use of other recyclable materials is however also conceivable.

An insensitivity to dust can furthermore be implemented by the characteristics of the knitted pattern structure. Dust in the vehicle is rapidly visible on smooth leather films, artificial leather films and foam films. In contrast, the relatively coarse knitted fabric pattern is entirely insensitive. Dust is not visible but can be readily vacuumed.

Knitted surface coverings furthermore offer the advantage that the tactile characteristics of the trim part and the tactile characteristics of the surface covering can be differently configured in the individual regions without seams being provided between the regions, as the seams can be integrated in the knitting process when producing the knitted semi-finished product. An airbag weakening can be achieved by weakening the knitted semi-finished product, for example by means of a laser, wherein this airbag weakening cannot be identified on a visible surface of the trim part. Alternatively thereto, an airbag weakening can also be achieved by weakening the knitted semi-finished product on a visible surface of the trim part, for example by means of a laser, wherein this airbag weakening in this instance can be identified by an occupant of the vehicle.

The advantages of the invention are to be summarized once again hereunder, wherein the mentioned advantages apply to the method as well as to the trim part. Because the surface covering is connected to the carrier part without an adhesive, the surface covering and the carrier part can be easily released from one another. The knitted surface covering can thus be changed or replaced, respectively, with less complexity. This replaceability offers advantages from the point of view of hygiene, because the surface covering can be easily and quickly cleaned. The replaceability of the surface covering results in a high degree of freedom for a user, as far as the possibility of customizing is concerned. It is even conceivable for the external appearance and thus the design of the trim part to be modified in the context of an update or an upgrade. The same also applies in the event that the surface covering is damaged or worn. Here too, a replacement or remedy, respectively, can be quickly achieved by virtue of the replaceability. Because the surface covering is connected to the underlying carrier part in a form-fitting manner only by way of the fastening elements, the process steps of flame treating, adhesive bonding and laminating which are customary in the prior art can be dispensed with. The production process can thus be simplified, and a reduction in terms of investment can be implemented.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
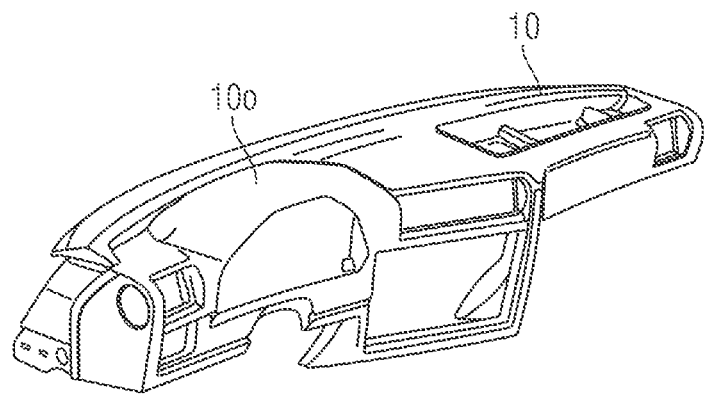
FIG. 1 is a perspective view of an exemplary carrier part.

FIG. 1 in an exemplary manner shows a dashboard support 10 which is to serve as a carrier part 10 for explaining the method. As an alternative to the dashboard support illustrated, all of the trim parts situated in the interior, such as glove boxes, center armrests, center consoles, visors, armrests in the door trims, door trims, roof liners, rear consoles, pillar trims, etc. can also serve as the carrier structure 10. This dashboard support 10 has a surface 10*o* which is to be laminated with the aid of a surface covering 20. This surface 10*o*, as illustrated in FIG. 1, can relate to only one portion such as, for example, the upper surface of the cowl of the so-called combination instrument. The surface 10*o* to be laminated can however also be any part of the surface of the carrier part 10 that would be visible by a vehicle occupant in the interior of the vehicle. Furthermore alternatively, the surface 10*o* can also comprise the entire surface of the carrier part 10, wherein in this instance regions of the support part 10 that are not visible to a vehicle occupant would also be laminated.

Figure 2:
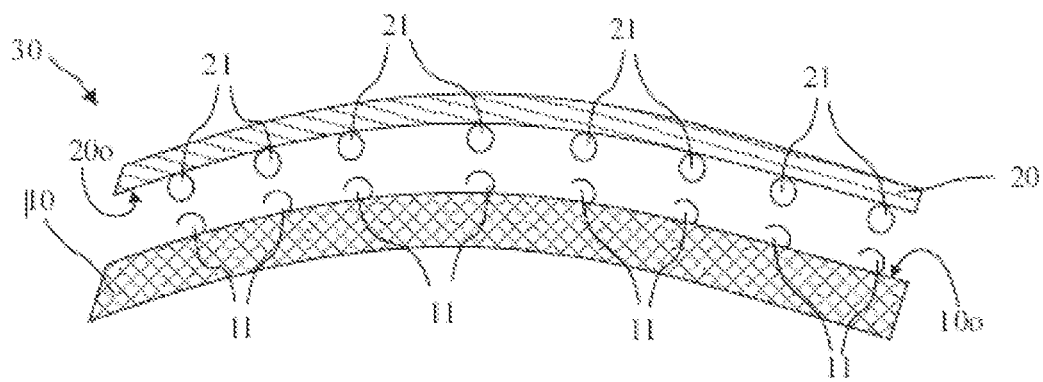
FIG. 2 is an exemplary sectional view through a trim part prior to the method step in which the surface covering is joined to the carrier part.

FIG. 2 shows a cross section through a trim part 30 for a vehicle interior of a vehicle not illustrated in more detail. The trim part 30 comprises a carrier part 10 onto which a surface covering 20 is laminated. The carrier part 10 has a surface 10*o* that faces the surface covering 20. Fixing elements 11, which in an exemplary manner here are illustrated in the shape of hooks, are provided on this surface 10*o*. In embodiments not illustrated, the fixing elements 11 may also have other shapes. However, it is essential that the fixing elements 11 can establish a form-fitting connection to the fastening elements 21, for example. The fastening elements 21 here are disposed on a surface 20*o* of the surface covering 20 that faces the carrier part 10. These fastening elements 21 in FIG. 2 in an exemplary manner are depicted as slings having a circular cross section. In further embodiments, not illustrated in the figures, the fastening elements can also have another design embodiment. It is only essential that there is the possibility for a form-fitting connection to be established with the fixing elements 11 of the carrier part 10.

Figure 3:
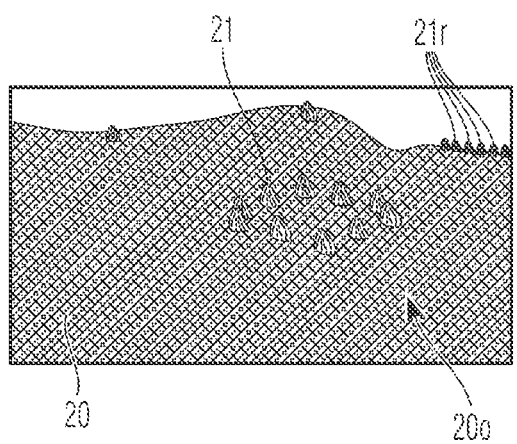
FIG. 3 is a view of a surface of the surface covering having fastening elements disposed thereon.
Figure 4:
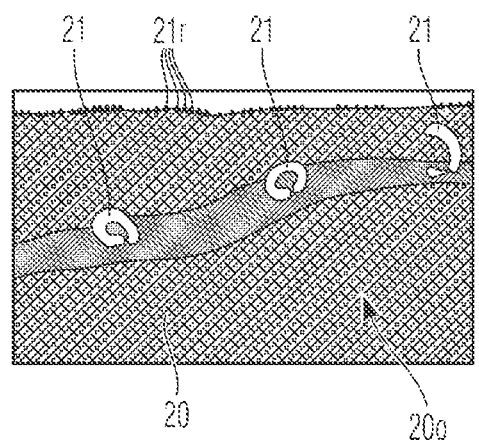
FIG. 4 is a view of a surface of the surface covering having fastening elements disposed thereon.

Surface coverings 20, when viewed onto the surface 20*o* thereof that faces the carrier part 10, are in each case illustrated in FIGS. 3 and 4. The fastening elements 21 illustrated in the central region of FIG. 3 are disposed in a circular manner and, as a result, can be connected in a form-fitting manner to fixing elements which are likewise provided in a circular manner on the carrier part 10. Such a circular arrangement is expedient when cutouts, for example for loudspeakers or ventilation openings, are provided in the circle in the carrier part. As a result, the surface covering 20 in this region can be positioned and fixed in a highly precise manner. In further exemplary embodiments not illustrated, the fixing elements 11 as well as the fastening elements 21 may also be disposed in other shapes which are configured so as not to be circular or circular only in portions. In principle, arrangements in the most varied geometric shapes can be represented, wherein these arrangements may have a contour which is closed or not closed.

Fastening elements 21*r* are depicted figuratively at the top right in FIG. 3. These fastening elements 21*r* are disposed on the surface 20*o* in a peripheral region which runs along and parallel to the edge of the surface covering 20. The peripheral region of the surface covering 20 can be very accurately fixed with the aid of these fastening elements 21*r*.

FIG. 4 shows a further illustration of the surface covering 20 in which the fastening elements 21 are depicted in an enlarged manner. In the foreground, fastening elements 21 are attached to the surface 20*o* of the surface covering 20. These covering elements 21 can be disposed in an arbitrary manner on the surface 20*o*. Fastening elements 21*r* which are disposed in the peripheral region of the surface covering 20 are provided in the background of FIG. 4.

Figure 5:
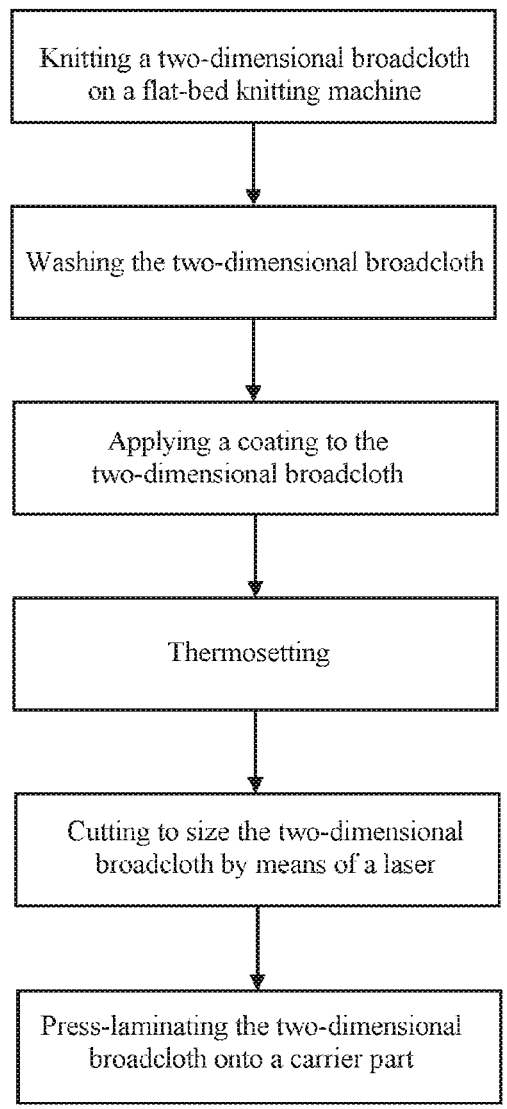
FIG. 5 shows the process sequence for producing a trim part according to a first embodiment of the method.

FIG. 5 shows a method for producing a surface covering 20 according to a first embodiment. First, a two-dimensional broadcloth is knitted on a flat-bed knitting machine having two needle beds. Once the broadcloth has been retrieved from the flat-bed knitting machine and optionally been rolled up, the broadcloth is washed in the subsequent step. Thereafter, a coating or waterproofing can be applied to the broadcloth. The two-dimensional broadcloth is thermoset after the coating has been applied. These steps from washing to thermosetting in most instances take place in a coupled continuous system and are referred to as "finishing", for example. The cutting to size of the two-dimensional broadcloth by means of a laser takes place after thermosetting, so as to obtain a desired tailored blank. Plate cutters or stamped blanks, etc., are also possible. The carrier part is subsequently covered by the two-dimensional fabric. The resulting product is a trim part, in particular for vehicles, for creatively trimming the vehicle interior, for example a dashboard, a door trim, a center armrest, etc.

Figure 6:
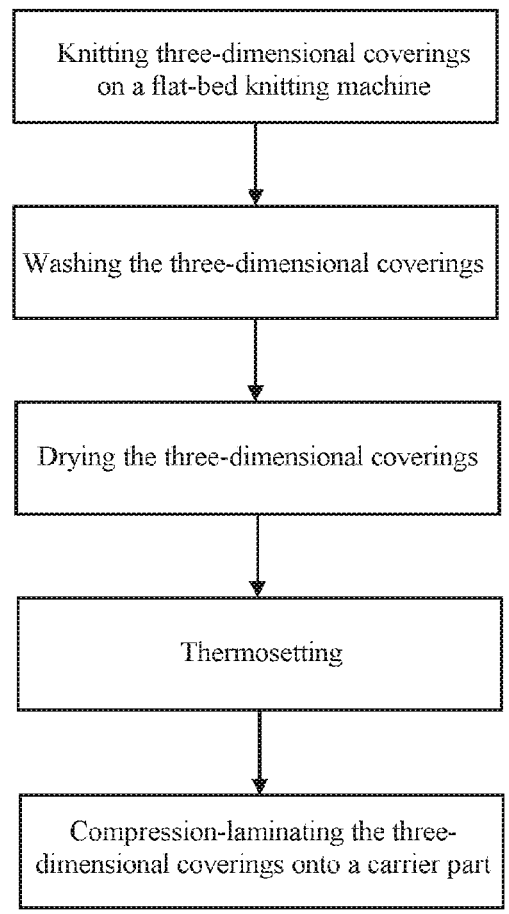
FIG. 6 shows a customary process sequence for producing a trim part according to a second embodiment of the method.

FIG. 6 shows a method for producing a surface covering 20 according to a second embodiment. In this second alternative of the method, the knitted semi-finished product is generated as a three-dimensional knitwear, or a three-dimensional covering, respectively, on a flat-bed knitting machine having two or more needle beds. Washing of the three-dimensional covering likewise takes place once the three-dimensional knitted semi-finished product, or the covering, respectively, has been demolded. The coverings are dried after the three-dimensional coverings have been washed. The three-dimensional coverings are thermoset after the coverings have been dried. Subsequently, the three-dimensionally knitted coverings are applied to the carrier part. Here too, the final product of the method is a trim part for creatively trimming the passenger cabin, for example a dashboard, a door trim, etc. In one variant of the method, the covering is not generated as one entity. Instead, individual parts of a covering are generated, wherein the individual parts are assembled so as to form one covering.

The entire covering can be a single knitted individual part, or be composed of a plurality of individual parts which are applied to the carrier part.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a trim part, comprising: generating a surface covering by a knitting method and disposing fastening elements on the surface covering; covering a carrier part with the generated surface covering, wherein fixing elements are disposed on the carrier part, and the fastening elements of the surface covering are connected in a form-fitting manner to the fixing elements of the carrier part.

2. The method according to claim 1, wherein
the fastening elements are disposed only in a peripheral region of a surface of the surface covering that faces the carrier part, and
the peripheral region extends along a circumference of the surface covering.

3. The method according to claim 1, wherein
the fastening elements are disposed on a surface of the surface covering that faces the carrier part, and
the fastening elements are distributed across the entire surface.

4. The method according to claim 1, wherein
the fastening elements are knitted when generating the surface covering.

5. The method according to claim 1, wherein
pre-existing fastening elements are incorporated in the knitting of the surface covering when generating the surface covering.

6. The method according to claim 1, wherein
pre-existing fastening elements are stitched to the surface covering after the surface covering has been generated.

7. The method according to claim 1, wherein
the surface covering, at least in portions, is connected in a materially integral manner to the carrier part.

8. A trim part, comprising: a knitted surface covering; and a carrier part, wherein fastening elements are disposed on the surface covering; fixing elements are disposed on the carrier part; and the fastening elements of the surface covering are connected in a form-fitting manner to the fixing elements of the carrier part.

9. The trim part according to claim 8, wherein
the fastening elements are knitted so as to be integral to the surface covering.

10. The trim part according to claim 8, wherein
the fastening elements are disposed on a surface of the surface covering that faces the carrier element, and
the fixing elements are disposed on a surface of the carrier element that faces the surface covering.

\* \* \* \* \*